United States Patent
Hara et al.

(10) Patent No.: US 6,854,857 B2
(45) Date of Patent: Feb. 15, 2005

(54) ELECTRONIC APPARATUS, LIQUID CRYSTAL DISPLAY DEVICE AND LIGHT GUIDE PLATE

(75) Inventors: Yasushi Hara, Kawasaki (JP); Hiroshi Yamada, Kawasaki (JP); Hirokazu Aritake, Kawasaki (JP); Akira Tanaka, Yokohama (JP); Makoto Abe, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/359,719

(22) Filed: Feb. 7, 2003

(65) Prior Publication Data

US 2003/0227768 A1 Dec. 11, 2003

(30) Foreign Application Priority Data

Jun. 11, 2002 (JP) .......................................... 2002-170268

(51) Int. Cl.[7] ................................................. F21V 5/00
(52) U.S. Cl. ............................. 362/31; 362/27; 362/333
(58) Field of Search ............................. 362/26, 27, 31, 362/330, 331, 332, 339; 349/65

(56) References Cited

U.S. PATENT DOCUMENTS 5,719,649 A * 2/1998 Shono et al. ................. 349/31
2003/0063234 A1 * 4/2003 Oda et al. ..................... 349/65
2003/0117792 A1 * 6/2003 Kunimochi et al. .......... 362/31

FOREIGN PATENT DOCUMENTS

| JP | 6-87929 | 12/1994 |
|---|---|---|
| JP | 8-271885 | 10/1996 |
| JP | 9-081048 | 3/1997 |
| JP | 11-038410 | 2/1999 |
| JP | 11-101980 | 4/1999 |
| JP | 11-345513 | 12/1999 |

* cited by examiner

*Primary Examiner*—Y. My Quach-Lee
(74) *Attorney, Agent, or Firm*—Staas & Halsey LLP

(57) ABSTRACT

An electronic apparatus includes a liquid crystal display device. The liquid crystal display device comprises first and second light sources, a light guide plate, and a liquid crystal unit. The first light source is disposed on one of two opposing side surfaces of the light guide plate. The second light source is disposed on the other of the two opposing side surfaces of the light guide plate. A first plurality of substantially parallel grooves are formed in a first surface of the light guide plate which is substantially parallel with a display surface of the liquid crystal unit. A second plurality of substantially parallel grooves are formed in a second surface opposing the first surface of the light guide plate. At least one of a dimension and density of the first plurality of grooves substantially monotonically changes from one in the vicinity of one of the light sources to one in the vicinity of the other of the light sources.

34 Claims, 5 Drawing Sheets

ELECTRONIC APPARATUS, LIQUID CRYSTAL DISPLAY DEVICE AND LIGHT GUIDE PLATE

FIELD OF THE INVENTION

This invention relates to a liquid crystal display device and an electronic apparatus with a liquid crystal display device. More particularly, this invention relates to an improved structure of a light guide plate for a backlight device for use in a liquid crystal display device for electronic apparatuses.

BACKGROUND OF THE INVENTION

Maruyama et al., in their Japanese Patent Application Publication No. HEI 11-38410 (A) laid open for public inspection on Feb. 12, 1999, disclose use of a semi-transmissive liquid crystal display device in order to reduce liquid crystal display device power dissipation or consumption. The liquid crystal display device of Maruyama et al. is operated as a transmissive liquid crystal display device by the use of a cold-cathode fluorescent lamp (CCFL) as a backlight source, when the liquid crystal display device is operated in a dark environment. In a light environment, it does not use the cold cathode fluorescent lamp, but uses a white reflective plate to reflect environmental light so that the liquid crystal display device can be operated as a reflective liquid crystal display device.

In order to reduce power dissipation, Kurumizawa discloses in his Japanese Patent Application Publication No. HEI 11-101980 (A) laid open for public inspection on Apr. 13, 1999, a liquid crystal display device using a cold cathode fluorescent lamp and chemiluminescence. The liquid crystal display device of Kurumizawa uses a cold cathode fluorescent lamp as a backlight source when an electronic apparatus which employs the liquid crystal display device is operated from an AC power supply, while it uses a bag containing a chemiluminescent mixture solution as a backlight source when the electronic apparatus is operated from a DC battery.

The semi-transmissive liquid crystal display device disclosed in Japanese Patent Application Publication No. HEI 11-38410 (A) can use a DC power supply battery for a longer time when it is operated as a reflective liquid crystal display device in a light place. The semi-transmissive liquid crystal display device uses a cold cathode fluorescent lamp when it is used in a dark environment and, therefore, requires higher brightness. However, its display is less bright than and, therefore, inferior in quality to an ordinary transmissive liquid crystal display device when it is operated from the same power supply level as the ordinary transmissive liquid crystal display device, because light transmission is restricted due to its semi-transmissive nature. Accordingly, the liquid crystal display device of Maruyama et al. requires higher power to provide the same brightness as the ordinary transmissive liquid crystal display device.

The liquid crystal display device employing a cold cathode fluorescent lamp and chemiluminescence disclosed in Japanese Patent Application Publication No. HEI 11-101980 (A) requires a bag containing chemically luminescent mixture solution to be inserted into the liquid crystal display device. This liquid crystal display device is not economical because, once the bag starts emitting light, the light emission cannot be interrupted. In addition, a user of the liquid crystal display device must take a chemiluminescent bag or bags with him or her, and must take a trouble of disposing the used bag.

The inventors have recognized that power dissipation of a liquid crystal display device and an electronic apparatus with the liquid crystal display device can be reduced by selectively using an efficient light source providing relatively high brightness (hereinafter referred to as high-brightness light source) and an efficient light source providing relatively low brightness (hereinafter referred to low-brightness light source) as a backlight source for the liquid crystal display device depending on brightness required for the liquid crystal display device. The inventors have also recognized that it is desirable to use a combination of high-brightness and low-brightness light sources with a light guide plate having prisms or grooves formed between the adjacent prisms arranged as to realize efficient use of light emitted from whichever light source selected and to realize uniform brightness distribution.

An object of the present invention is to provide a light guide plate having a structure suitable for use with a combination of two light sources providing high brightness and low brightness.

SUMMARY OF THE INVENTION

In accordance with one aspect of the present invention, an electronic apparatus includes a liquid crystal display device. The liquid crystal display device comprises first and second light sources, a light guide plate, and a liquid crystal unit or panel. The first light source is disposed on one of two opposing side surfaces of the light guide plate. The second light source is disposed on the other of the two opposing side surfaces of the light guide plate. A first plurality of substantially parallel grooves are formed in a first surface of the light guide plate which is substantially parallel with a display surface of the liquid crystal unit. A second plurality of substantially parallel grooves are formed in a second surface opposing the first surface of the light guide plate. At least one of a dimension and density of the first plurality of grooves substantially monotonically decreases or increases from one in the vicinity of one of the light sources to one in the vicinity of the other of the light sources.

One of a depth and density of the first plurality of grooves substantially gradually decreases from one in the vicinity of one of said light sources to one in the vicinity of the other of said light sources.

Each of the first plurality of grooves is formed of a first sloping surface closer to the second light source and a second sloping surface closer to the first light source. An angle formed between the first sloping surface and a first plane in which the first surface of said light guide plate lies is smaller than an angle formed between the second sloping surface and the first plane.

In accordance with another aspect of the invention, a liquid crystal display device includes first and second light sources, a light guide plate and a liquid crystal unit. The first light source is disposed on one of two opposing side surfaces of the light guide plate, and the second light source is disposed on the other of the two opposing side surfaces of the light guide plate. A first plurality of substantially parallel grooves are formed in a first surface of the light guide plate which is substantially parallel with a display surface of the liquid crystal unit. A second plurality of substantially parallel grooves are formed in a second surface opposing the first surface of the light guide plate. At least one of a dimension and density of the first plurality of grooves substantially monotonically decreases or increases from one in one side of the light sources to one in the vicinity of the other side of the light sources.

In accordance with a further aspect of the invention, A light guide plate includes generally rectangular first and second opposing surfaces. A first plurality of substantially parallel grooves being formed in the first surface. A second plurality of substantially parallel grooves is formed in the second surface. At least one of a dimension and density of the first plurality of grooves substantially monotonically changing from one of two opposing sides of the first surface to the other of the two sides.

According to the present invention, a liquid crystal display device with a light guide plate having a structure suitable for use with a combination of selectively used high-brightness and low-brightness light sources.

DESCRIPTION OF PREFERRED EMBODIMENTS

Figure 1:
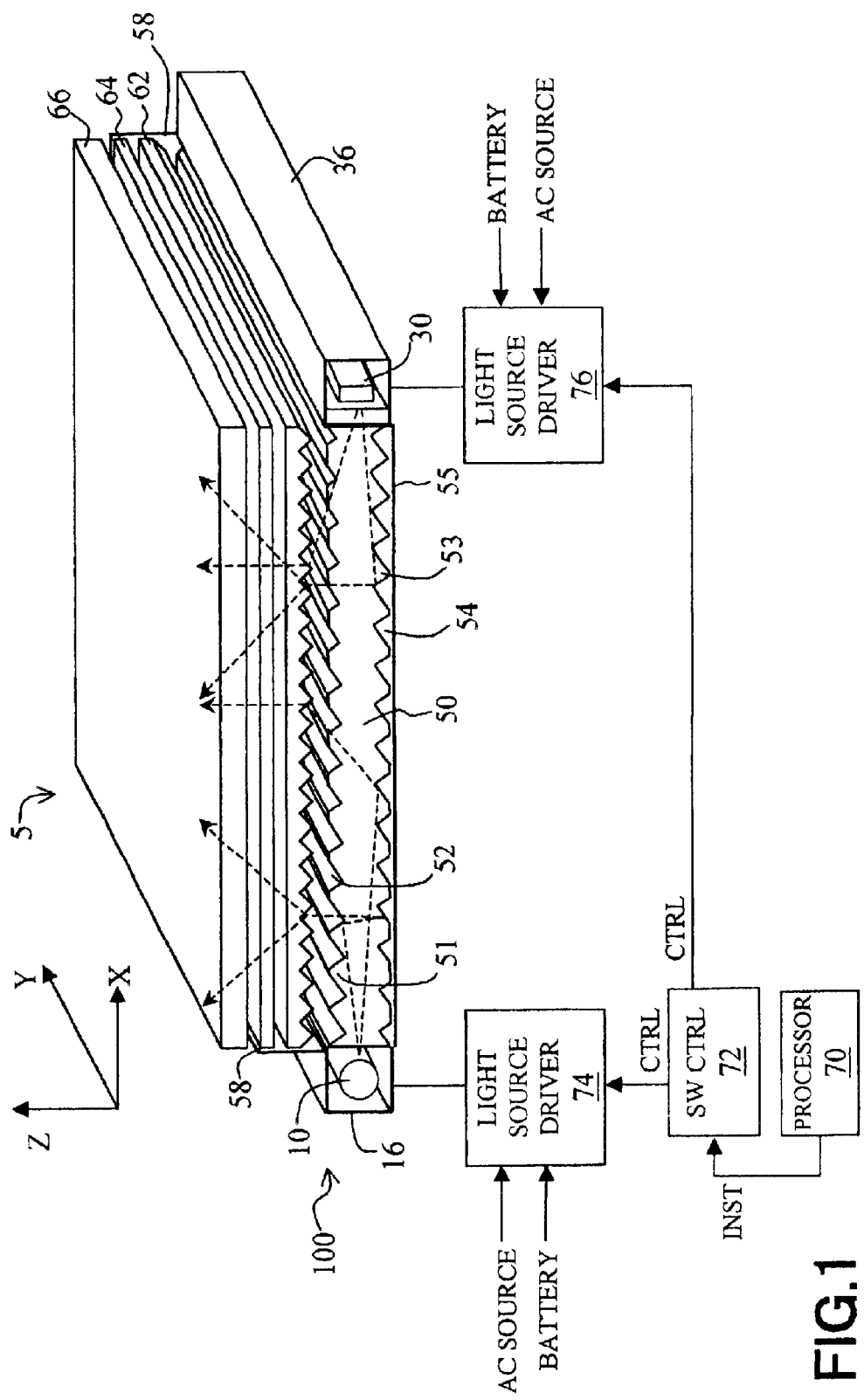
FIG. 1 is a perspective view of a liquid crystal display device with a backlight device and also shows a light source switching control unit, a high-brightness light source driving unit and a low-brightness light source driving unit, in accordance with the present invention.

In accordance with the present invention, high-brightness and low-brightness light sources are used in combination as light sources providing backlight for a transmissive liquid crystal display device (LCD) for use in a portable or mobile electronic apparatus, such as a notebook personal computer, a handheld personal computer or a personal digital assistant (PDA). The high-brightness light source may be a typical cold cathode fluorescent lamp or a typical fluorescent lamp, which provides high brightness and exhibits a high power efficiency. The low-brightness light source may be a light emitting diode (LED), or a cold cathode fluorescent lamp or a fluorescent lamp which are arranged to provide low brightness at a high power efficiency. For a range of low brightness, an LED has a higher power efficiency than a high-brightness providing cold cathode fluorescent lamp. The inventors have recognized that, by the use of ten LED's for providing low display brightness obtainable by a high-brightness cold cathode fluorescent lamp on a liquid crystal display surface having a display area of about 200 $cm^2$, dissipated power can be reduced by an amount of up to about 40% to about 60% (about 300 mW to about 400 mW) of the power which would be dissipated if the cold cathode fluorescent lamp was used.

In a transmissive liquid crystal display device in accordance with the present invention and an electronic apparatus with such a liquid crystal display device, a cold cathode fluorescent lamp is used for desired display brightness of, for example, 23 $cd/m^2$ higher than a threshold value of, for example, 20 $cd/m^2$ to thereby ensure satisfactory display quality. On the other hand, if a desired display brightness is equal to or lower than the threshold value, for example, 5 $cd/m^2$ or 20 $cd/m^2$, an LED is used to save the power dissipation to prolong the life of a battery. Also, the life of the cold cathode fluorescent lamp can be prolonged by using the LED as frequently as possible. For that purpose, switching control between the light sources is provided for the electronic apparatus.

Alternatively, when an external AC power supply is used for a transmissive liquid crystal display device and an electronic apparatus with such a liquid crystal display device, a cold cathode fluorescent lamp may be used as a light source to ensure satisfactory display quality. On the other hand, when a DC battery source is used, an LED may be used as a light source to save power dissipation so that the battery can be used longer.

Alternatively, when an external AC power supply is used or when desired display brightness is set to a value of, for example, 25 $cd/m^2$, which is higher than a threshold value of, for example, 20 $cd/m^2$, for a transmissive liquid crystal display device and an electronic apparatus with such a liquid crystal display device, a cold cathode fluorescent lamp may be used as a light source to thereby ensure satisfactory display quality. On the other hand, when a DC battery is employed as a power supply with desired brightness of, for example, 5 $cd/m^2$ or 20 $cd/m^2$, which is equal to or lower than the threshold value, an LED may be used.

Now, preferred embodiments are described with reference to the accompanying drawings. Throughout the drawings, similar or same elements and functions are provided with the same reference numerals.

FIG. 1 shows a perspective view of a liquid crystal display device 5 including with a backlight device 100, a light source switching control unit 72, a high-brightness light source driving unit 74 and a low-brightness light source driving unit 76. The backlight device 100 is disposed on the rear side of the transmissive liquid crystal panel 66.

The high-brightness light source driving unit 74 is coupled to an external AC power supply (not shown) and to a DC battery (not shown). The low-brightness light source driving unit 76 is coupled to the DC battery. The low-brightness light source driving unit 76 may be additionally coupled to the external AC power supply. The light source switching control unit 72 activates selectively the high-brightness light source driving unit 74 and the low-brightness light source driving unit 76 in response to an instruction INST from a microprocessor or microcontroller 70 of an electronic apparatus (not shown). The microprocessor provides the instruction INST in accordance with display brightness set by a user.

In FIG. 1, the backlight device 100 includes a high-brightness light source 10, a low-brightness light source 30, a generally rectangular light guide plate 50 having substantially parallel opposing sides, a lenticular lens or film 62, and a brightness enhanced film (BEF) 64. The light guide plate 50 is typically formed of acrylic resin, and has a thickness of from about 1.8 mm to about 2.0 mm. The light guide plate 50 is rectangular, having a height of about 10 cm, a width of about 20 cm, and an area of about 200 $cm^2$. The light guide plate 50 is located behind a stack of the lenticular lens 62, the BEF 64 and the transmissive liquid crystal panel 66. In the actual device, the light guide plate 50, the lenticular lens 62, the BEF 64 and the transmissive liquid crystal panel 66 arranged in the named order are disposed in contact, but, in FIG. 1, for ease of understanding, they are shown as if they were spaced from each other.

In FIG. 1, the direction from the high-brightness light source 10 toward the light guide plate 50 is referred to as X-direction, the direction along the length of the high-brightness light source 10 is referred to as Y-direction, and the direction from the light guide plate 50 toward the transmissive liquid crystal panel 66 is referred to as Z-direction.

The high-brightness and low-brightness light sources 10 and 30 are disposed on opposing lateral sides of the light guide plate 50 and emit and direct light toward the light guide plate 50. In other words, the high-brightness and low-brightness light sources 10 and 30 are sidelights of the liquid crystal display device 5. The high-brightness light source 10 is covered by a reflector cover 16 opening toward the light guide plate 50. The low-brightness light source 30 is covered by a reflector cover 36 opening toward the light guide plate 50. The reflector covers 16 and 36 are typically formed of aluminum plates with mirror-surface providing films bonded to their inner surfaces. In order to clearly show the structure, the reflector covers 16 and 36 are shown with part thereof removed.

The lenticular lens 62 is a sheet having two major surfaces one of which is flat. The other surface is provided with a plurality of parallel, triangular prisms. The lenticular lens 62 is disposed with the flat surface (hereinafter referred to as front surface) facing toward the liquid crystal panel 66, and with the surface (hereinafter referred to as rear surface) with the prisms facing the light guide plate 50. The lenticular lens 62 is oriented such that the plurality of parallel prisms extend along the Y-direction. The lenticular lens 62 is arranged such that light impinging on the lenticular lens 62 from the rear surface at an angle of about 30°, i.e. at an angle of incidence of about 60°, can be refracted to go out through the front surface in substantially perpendicular direction, toward the BEF 64, and light impinging substantially perpendicularly on the rear surface can be refracted to go out through the front flat surface at about 45° toward the BEF 64.

The front surface of the light guide plate 50, i.e. the surface on the panel side, and the opposite rear surface are provided with a plurality of parallel prisms 51 and 53, respectively. The prisms 51 and 53 are generally triangular or rectangular shaped ones and extend in the Y-direction. The depth and/or density of grooves between adjacent ones of the prisms 51 in the front surface of the light guide plate 50 vary in the X-direction. As will be described in detail later, the groove depth and/or density become gradually smaller from the high-brightness light source 10 side toward the low-brightness light source 30 side. Similarly, the depth and/or density of grooves between adjacent ones of the prisms 53 in the rear surface of the light guide plate 50 vary in the X-direction. As will be described in detail later, the groove depth and/or density become gradually larger from the high-brightness light source 10 side toward the low-brightness light source 30 side.

The rear surface of the light guide plate 50 is covered with a known reflective sheet 55. The side surfaces of the light guide plate 50, the lenticular lens 62 and the BEF 64 are covered with a reflective sheet 58. The light reflective surface of the reflective sheet 55 is provided with a number of circular, convex protuberances (not shown) which scatter light impinging thereon. It should be noted that the reflective sheet 58 covering the surfaces of the light guide plate 50, the lenticular lens 62 and the BEF 64 on the front side of the sheet of the drawing is not shown in order to show the structure.

Figure 2B:
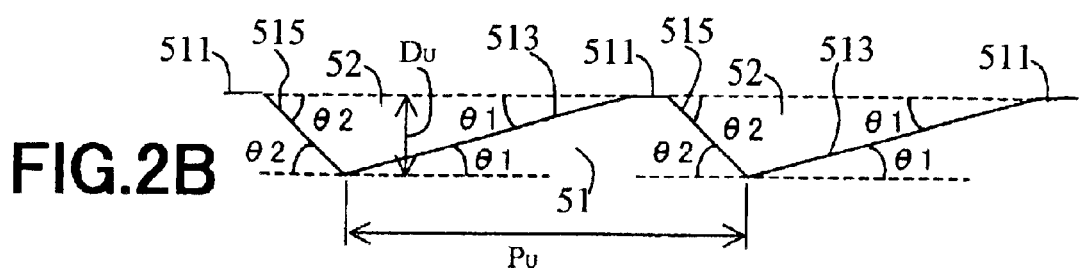
FIGS. 2A through 2C show the arrangements and shapes of front-side and rear-side prism sections, and arrangements and shapes of grooves formed between adjacent prisms.
Figure 2A:
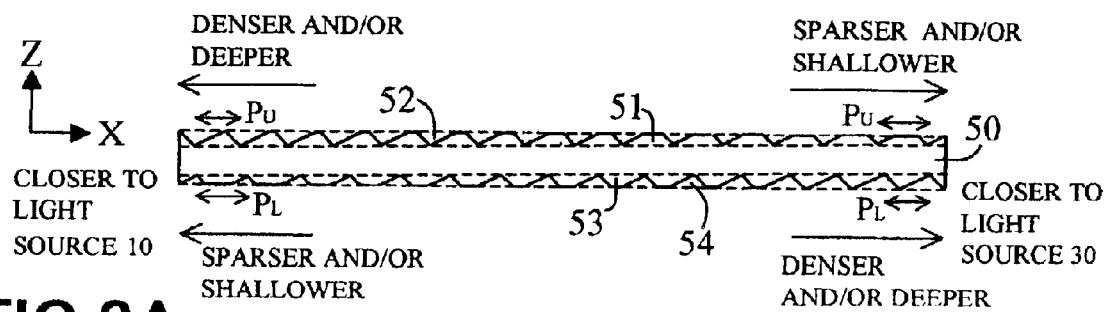
Figure 2C:
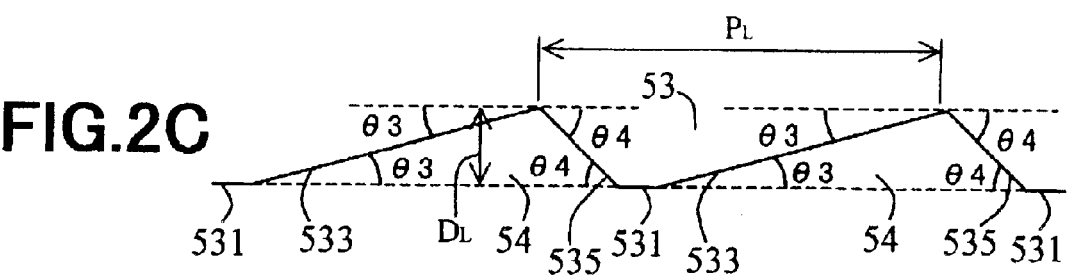

Referring now to FIGS. 2A, 2B and 2C, the arrangements and shapes of the prisms 51 and the grooves 52 between adjacent prisms 51 in the front surface of the light guide plate 50, and the arrangements and shapes of the prisms 53 and the grooves 54 between adjacent prisms 53 in the rear surface are described. FIG. 2A is a side view of the plate 50 shown in FIG. 1 viewed in the Y-direction. FIG. 2B is an enlarged side view of some of the prisms 51 and adjacent grooves 52 in the front surface, and FIG. 2C is an enlarged side view of some of the prisms 53 and adjacent grooves 54 in the rear surface of the light guide plate 50.

Each prism 51 as shown in FIG. 2B has a top flat surface 511, a gentle-sloped surface 513 and a steep-sloped surface 515. The width of the top flat surface 511 is smaller nearer to the high-brightness light source 10, and becomes larger toward the low-brightness light source 30. The width of the top flat surface 511 may be zero (0) in regions nearer to the high-brightness light source 10. Thus, each prism 51 is formed either of the surfaces 511, 513 and 515, or of the surfaces 513 and 515. Each groove 52 between adjacent prisms 51 is formed of the steep-sloped surface 515 of one prism 51 and the adjacent gentle-sloped surface of the adjacent prism. The cross-sectional shapes of the grooves 52 in the X-Z plane are preferably similar triangles.

The angle $\theta 1$ formed between the surface 513 of each prism 51 and the plane in which the top flat surfaces 511 of the prisms 51 lie is smaller than the angle $\theta 2$ formed between the surface 515 and the plane in which the top flat surfaces 511 of the prisms 51 lie. That is, $\theta 1 < \theta 2$. The angle $\theta 1$ is within a range of from about 10° to about 50°, preferably within a range of from about 20° to about 40°, and more preferably within a range of from about 25° to about 35°. The angle $\theta 1$ may be, for example, about 30°. The angle $\theta 2$ is within a range of from about 25° to about 65°, preferably within a range of from about 35° to about 55°, and more preferably within a range of from about 40° to about 50°. The angle $\theta 2$ may be, for example, about 45°.

According to an aspect of the present invention, the grooves in the front surface of the light guide plate are deeper in regions near the high-brightness light source 10 than toward the end region adjacent to the low-brightness light source 30. The groove depth $D_U$ (i.e. the height of the prisms 51) is within a range of from about 0.01 mm to about 0.4 mm, preferably from about 0.015 mm to about 0.15 mm, and varies within a range of, for example, from about 0.03 mm to about 0.075 mm. The groove pitch $P_U$ has a fixed value within a range of about 0.1 mm to about 0.5 mm, preferably, within a range of about 0.2 mm to about 0.4 mm. The groove pitch $P_U$ may be about 0.3 mm, for example.

According to an aspect of the present invention, the groove pitch is smaller, or, in other words, the groove density is higher in regions nearer to the high-brightness light source 10 than in regions further away from the high brightness light source 10. The groove pitch becomes larger, or the groove density becomes lower, toward the end region adjacent to the low-brightness light source 30. The groove density is the reciprocal of the groove pitch. According to an aspect of the present invention, the groove pitch $P_U$ is within a range of from about 0.03 mm to about 0.8 mm, preferably, from about 0.05 mm to about 0.6 mm. The groove pitch $P_U$ varies within a range of, for example, from about 0.15 mm to about 0.45 mm. The groove depth $D_U$ in this aspect has a fixed value within a range of from about 0.01 mm to about 0.2 mm. It may be, for example, about 0.07 mm.

According to another aspect of the present invention, both the groove depth $D_U$ and pitch $P_U$ vary within the above-described ranges of values. According to an aspect of the present invention, the grooves in the front surface of the light guide plate are deeper and denser in regions nearer to the high-brightness light source 10, than in regions toward the end region adjacent to the low-brightness light source 30.

Each of the prisms 53 in the rear surface of the light guide plate 50 has a flat top surface 531, a gentle-sloped surface 533 and a steep-sloped surface 535 as shown in FIG. 2C. The width of the flat top surfaces 531 of the prisms 53 is larger in regions nearer to the high-brightness light source 10 and becomes smaller toward the end region adjacent to the low-brightness light source 30. The width of the surfaces 531 in regions nearer to the low-brightness light source 30 may be zero (0). Thus, each prism 53 is formed of the surfaces 531, 533 and 535 or the surfaces 533 and 535. A groove 54 is formed of the surfaces 533 and 535 of adjacent two prisms 53. The cross-sectional shapes of the grooves 54 in the X-Z plane preferably are substantially similar triangles.

The angle θ3 formed between the surface 533 of each prism 53 and a plane in which the surfaces 531 of the prisms 53 lie is smaller than the angle θ4 formed between the surface 535 and the plane in which the surfaces 531 lie. That is θ3<θ4. The angle θ3 is within a range of from about 10° to about 50°, preferably, from about 20° to about 40°, and more preferably, from about 25° to about 35°. It may be, for example, 30°. The angle θ4 is within a range of from about 25° to about 65°, preferably, from about 35° to about 55°, and more preferably, from about 40° to about 50°. It may be, for example, about 45°.

In one example, the grooves in the rear surface of the light guide plate are shallower in regions near the high-brightness light source 10 and become deeper toward the end adjacent to the low-brightness light source 30. The groove depth $D_L$ (i.e. the height of the prism 53) is within a range of from about 0.01 mm to about 0.4 mm, and preferably, from about 0.015 mm to about 0.15 mm. It may vary within a range of, for example, from about 0.03 mm to about 0.075 mm. The groove pitch $P_L$ has a fixed value within a range of from about 0.1 mm to about 0.5 mm, and preferably, within a range of from about 0.2 mm to about 0.4 mm. The pitch $P_L$ may be, for example, about 0.3 mm.

According to another aspect of the present invention, the grooves in the rear surface of the light guide plate are less dense in regions nearer to the high-brightness light source 10 than toward the end adjacent to the low-brightness light source 30. The groove pitch $P_L$ is within a range of from a range of from about 0.03 mm to about 0.8 mm, and preferably, from about 0.05 mm to about 0.6 mm. It may vary within a range of, for example, from about 0.15 mm to about 0.45 mm. The groove depth $D_L$ has a fixed value within a range of from about 0.01 mm to about 0.2 mm, and may be, for example, about 0.7 mm.

According to another aspect of the invention, both the depth $D_L$ and the pitch $P_L$ may vary within the above-described respective ranges. More specifically, the grooves in the rear surface of the light guide plate are shallower and sparce in regions near the high-brightness light source 10 and become deeper and denser toward the end adjacent to the low-brightness light source 30.

The gentle-sloped surfaces 513 of the prisms 51 in the front surface of the light guide plate 50 receive light mainly coming from the low-brightness light source 30, which is located rightward of the surfaces 513 in the plane of the sheet of the drawing, and cause the received light to go out upward at about 30° with respect to the top flat surface 511. The light coming out from the light guide plate 50 is refracted toward the transmissive liquid crystal panel 66 by the lenticular lens 62 to a direction generally perpendicular to the display surface.

The steep-sloped surfaces 535 of the prisms 53 in the rear surface of the light guide plate 50 receive light mainly coming from the low-brightness light source 30, which is located rightward of the surfaces 535 in the plane of the sheet of the drawing, and reflect the received light upward at right angles with respect to the top flat surface 531. The surfaces 513 and 515 of the prisms 51 in the front surface of the light guide plate 50 cause the light from the surfaces 535 of the prisms 53 to go out upward toward the lenticular lens 62 in a direction generally perpendicular to the display surface. The lenticular lens 62 refracts the light at generally 45° rightward and leftward toward the transmissive liquid crystal panel 66.

Light from the high-brightness light source 10 located on the left side of the light guide plate 50 in the drawing sheet impinges onto the gentle-sloped surfaces 533 in the rear surface of the light guide plate 50 and is reflected by the surfaces 533 in a direction at generally 30° with respect to the plane 511. The gentle-sloped and steep-sloped surfaces 513 and 515 of the prisms 51 cause the reflected light from the gentle-sloped surfaces 533 to go out upward toward the lenticular lens 62 at generally 30° with respect to the display surface. The light, then, is refracted by the lenticular lens 62 at right angles with respect to the display surface and advances to the transmissive liquid crystal panel 66.

The steep-sloped surfaces 515 of the prisms 51 receive light coming mainly from the high-brightness light source 10 located on the left side of the light guide panel 50 in the sheet of the drawing, and reflect it downward at generally right angles with respect to the plane 511. The gentle-sloped and steep-sloped surfaces 533 and 535 of the prisms 53 reflect, in conjunction with the reflective sheet 55, the light from the surfaces 515 upward generally perpendicularly relative to the plane 511. The gentle-sloped and steep-sloped surfaces 513 and 515 of the prisms 51 in the front surface of the light guide plate 50 cause the light to go out upward at generally right angles relative to the display surface toward the lenticular lens 62, and the lenticular lens 62 refracts the light right and left at generally 45° relative to the display surface toward the transmissive liquid crystal panel 66.

The light guide plate 50 with the above-described structure can direct light from the low-brightness light source 30 at a higher efficiency than light from the high-brightness light source 10 toward the liquid crystal panel 66.

In operation, in the electronic apparatus (FIG. 1) including the liquid crystal display device 5 with the backlight device 100, when the desired brightness set by the user is higher than a threshold value of, for example, 20 cd/m$^2$, the processor 70 supplies an instruction INST for selecting the high-brightness light source 10 and designating the level of the display brightness to the light source switching control unit 72. In response to the instruction INST from the processor 70, the light source switching control unit 72 supplies a control signal CTRL to activate the high-brightness light source driving unit 74 which powers the high-brightness light source 10, and also causes the cold cathode fluorescent lamp driving unit 74 to control the brightness of the high-brightness light source 10 in accordance with the desired brightness.

When the desired display brightness set by the user is equal to or lower than the threshold value of 20 cd/m$^2$, the processor 70 supplies the instruction INST for selecting the low-brightness light source 30 and designating the level of the display brightness to the light source switching control unit 72. In response to this instruction INST, the light source switching control unit 72 provides a control signal CTRL to activate the low-brightness light source driving unit 76 which powers the low-brightness light source 30, and also causes the low-brightness light source driving unit 76 to control the brightness of the low-brightness light source 30 in accordance with the desired display brightness.

In an alternative arrangement, when the electronic apparatus is operated from an AC power supply, the processor 70 may supply the light source switching control unit 72 with an instruction INST for causing the high-brightness light source 10 to be selected and for designating the level of the display brightness. In response to this instruction INST, the light source switching control unit 72 provides a control signal CTRL to activate the high-brightness light source driving unit 74 which powers the high-brightness light source 10, and also causes the high-brightness light source driving unit 74 to control the brightness of the high-brightness light source 10 for providing a desired display brightness in a relatively high brightness range of, for example, 15 cd/m$^2$ and higher.

On the other hand, when the electronic apparatus is operated from a DC battery, the processor 70 supplies the light source switching control unit 72 with an instruction INST for causing the low-brightness light source 30 to be selected and for designating the level of the display brightness. In response to this instruction INST, the light source switching control unit 72 provides a control signal CTRL to activate the low-brightness light source driving unit 76 which powers the low-brightness light source 30, and also causes the low-brightness light source driving unit 76 to control the brightness of the low-brightness light source 30 for providing a desired display brightness in a relatively low brightness range of, for example, from 5 cd/m$^2$ to 20 cd/m$^2$.

In a still alternative arrangement, when the electronic apparatus is powered from an AC power supply, or when the electronic apparatus is powered from a DC battery and the desired brightness designated by the user is higher than a threshold value of, for example, 20 cd/m$^2$, the processor 70 may supply the light source switching control unit 72 with an instruction INST for selecting the high-brightness light source 10 and designating the level of the display brightness. In response to this instruction INST, the light source switching control unit 72 supplies the high-brightness light source driving unit 74 with a control signal CTRL to activate the high-brightness light source driving unit 74, and also causes the high-brightness light source driving unit 74 to control the brightness of the high-brightness light source 10 in accordance with the desired brightness designated by the user.

On the other hand, when the electronic apparatus is operated from a DC battery and the desired brightness designated by the user is equal to or lower than the threshold value of 20 cd/m$^2$, the processor 70 supplies the light source switching control unit 72 with an instruction INST for selecting the low-brightness light source 30 and designating the level of the display brightness. In response to this instruction INST, the light source switching control unit 72 supplies the low-brightness light source driving unit 76 with a control signal CTRL to activate the low-brightness light source driving unit 76, and also causes the low-brightness light source driving unit 76 to control the brightness of the low-brightness light source 30 in accordance with the desired brightness designated by the user.

Figure 3A:
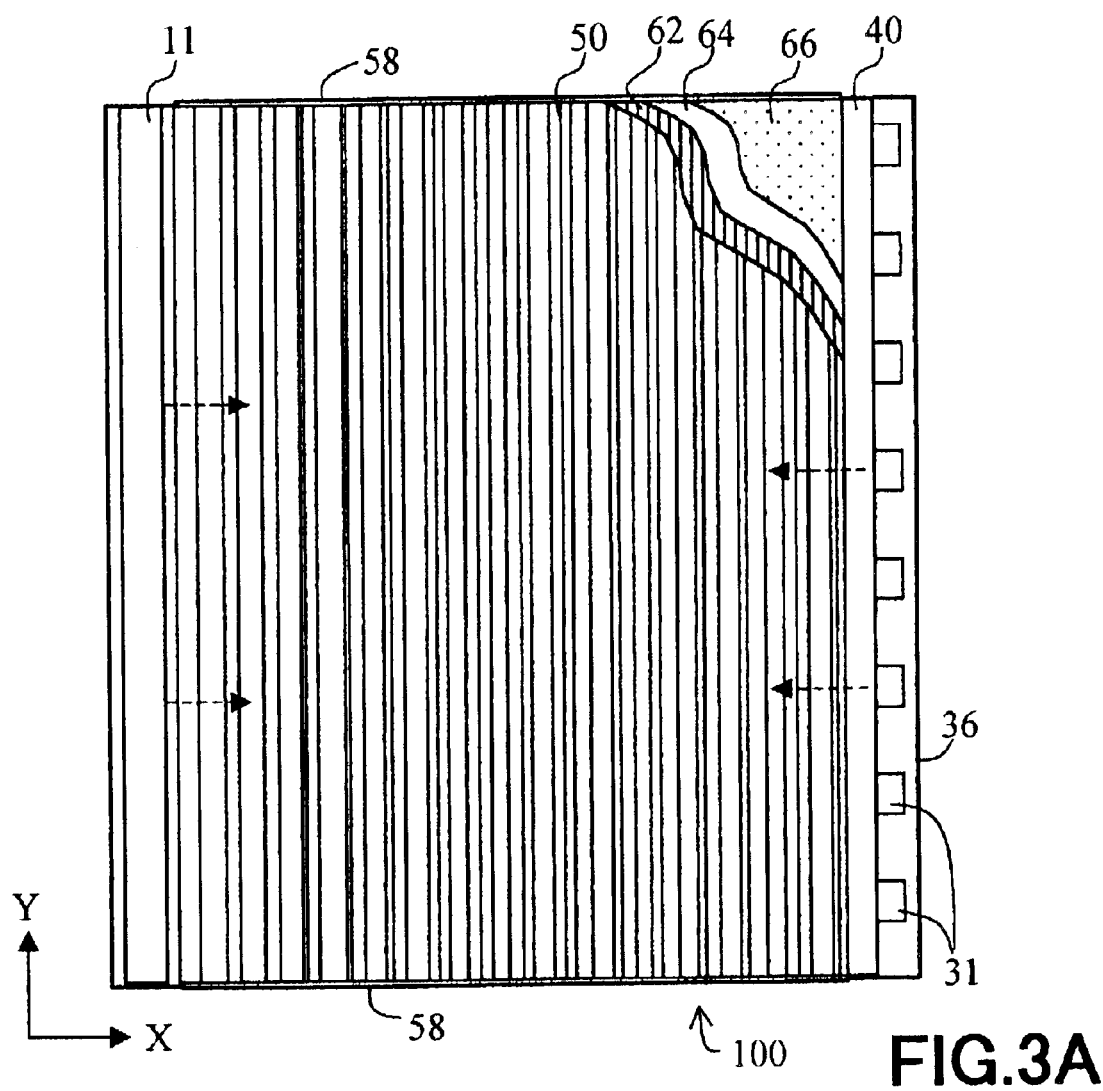
FIGS. 3A and 3B are front and bottom views of the liquid crystal display device shown in FIG. 1.
Figure 3B:
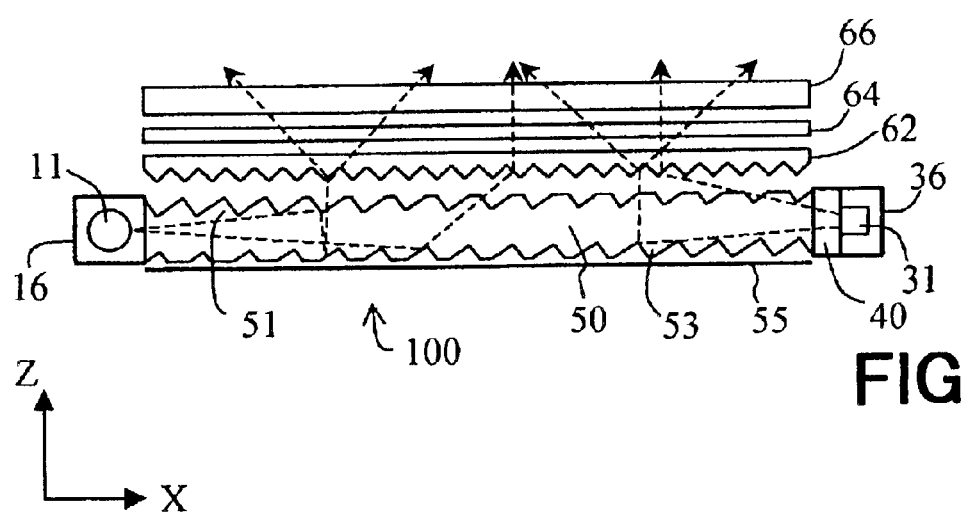

FIG. 3A is a front elevational view of the liquid crystal display device 5 with the backlight device 100, in accordance with the embodiment shown in FIG. 1. In order to show the light guide plate 50, the liquid crystal panel 66, the BEF 64 and the lenticular lens 62 are partially broken away. FIG. 3B is a bottom view of the liquid crystal display device 5 shown in FIG. 3A seen from below its bottom.

Along the left side of the light guide plate 50, a high-brightness cold cathode fluorescent lamp 11 is disposed, as the high-brightness light source 10, which emits light in the X-direction toward the light guide plate 50.

Along the right side of the light guide plate 50, a plurality of LED's 31 are disposed as the low-brightness light source 30. The LED's 31 emit light in the -X-direction toward the light guide plate 50 through an elongated light-diffusing light guide bar 40. A first surface of the light guide bar 40 facing the LED's 31 is substantially parallel with the opposing second surface thereof. A large number of minute irregularities are formed in one or both of the first and second surfaces of the light guide bar 40 to provide the light guide bar 40 with a frosted glass like surface.

Light from the cold cathode fluorescent lamp 11 enters in the X-direction into the light guide plate 50 as indicated by broken-line arrows, and is reflected by the reflective sheets 55 and 58 disposed in the rear and upper and bottom sides of the light guide plate 50. The surfaces 511, 513, 515, 531, 533 and 535 of the prisms 51 and 53 cause the light to be directed to the lenticular lens 62, the BEF 64 and the liquid crystal panel 66 in the manner described above with reference to FIG. 2.

Light from the LED's 31 enters in the -X-direction into the light guide plate 50 through the light guide bar 40. Light is diffused and reflected by the irregularities in the surface or surfaces of the light guide bar 40, and further reflected by the reflector cover 36 in the -X-direction into the light guide plate 50. The light entering into the light guide plate 50 is reflected by the reflective sheets 55 and 58 disposed in the rear side and the upper and bottom sides of the light guide plate 50, respectively. The surfaces 511, 513, 515, 531, 533 and 535 of the prisms 51 and 53 cause the reflected light to be directed to the lenticular lens 62, the BEF 64 and the liquid crystal panel 66 in the manner described above with reference to FIG. 2.

With the above-described arrangement, a good display quality can be secured by the use of the cold cathode fluorescent lamp 11 as the high-brightness light source 10, and the lifetime of the DC batteries can be elongated by the use of the LED's 30 as the low-brightness light source 30.

Figure 4A:
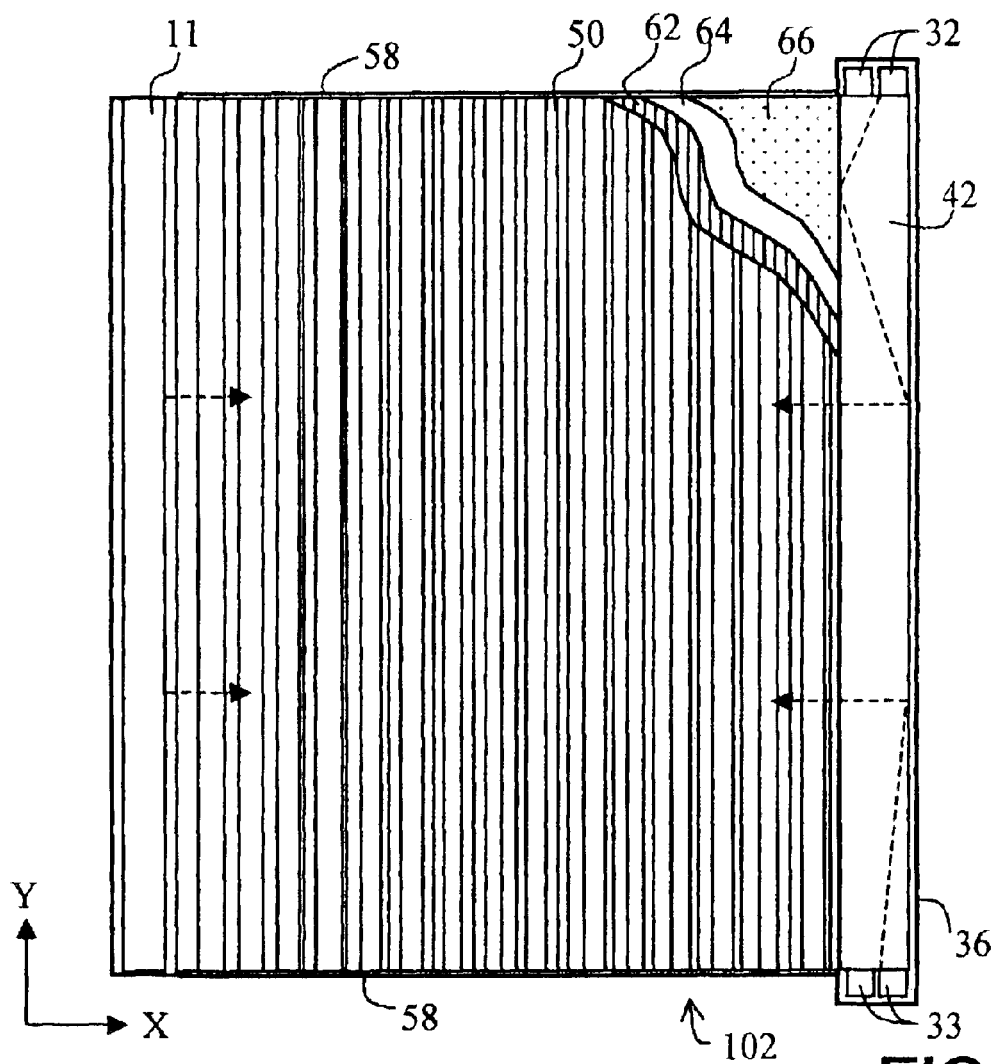
FIGS. 4A and 4B are front and bottom views of a liquid crystal display device with a backlight device, in accordance with a modification of the first embodiment of the present invention.
Figure 4B:
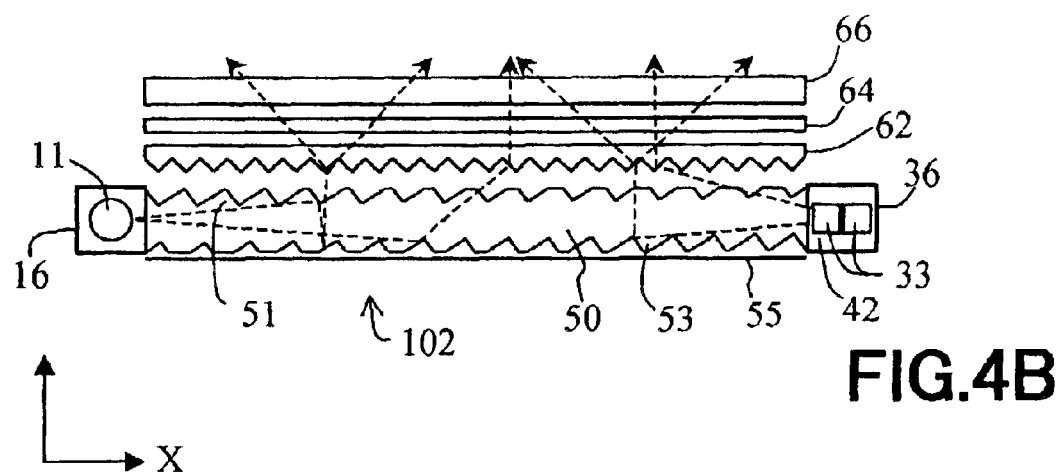

FIG. 4A is a front elevational view of a liquid crystal display device 5 including a backlight device 102, in accordance with a modification of the first embodiment, and FIG. 4B is a bottom view of the liquid crystal device 5 shown in FIG. 4A.

An elongated light guide bar 42 is disposed to extend along the right side of the light guide plate 50 of the backlight device 102. One or more LED's 32 are disposed on the upper end surface of the light guide bar 42, and one or more LED's 33 are disposed on the lower end surface of the light guide bar 42. Irregularities are formed in the right or outer side surface of the light guide bar 42 to frost the surface. Except for the sides facing the light guide plate 50, the light guide bar 42 and the LED's 32 and 33 are covered by a reflector cover 36. The structure of the remaining portion of the backlight device 102 is the same as shown in FIGS. 2A and 2B, and hence is not described again.

Figure 5A:
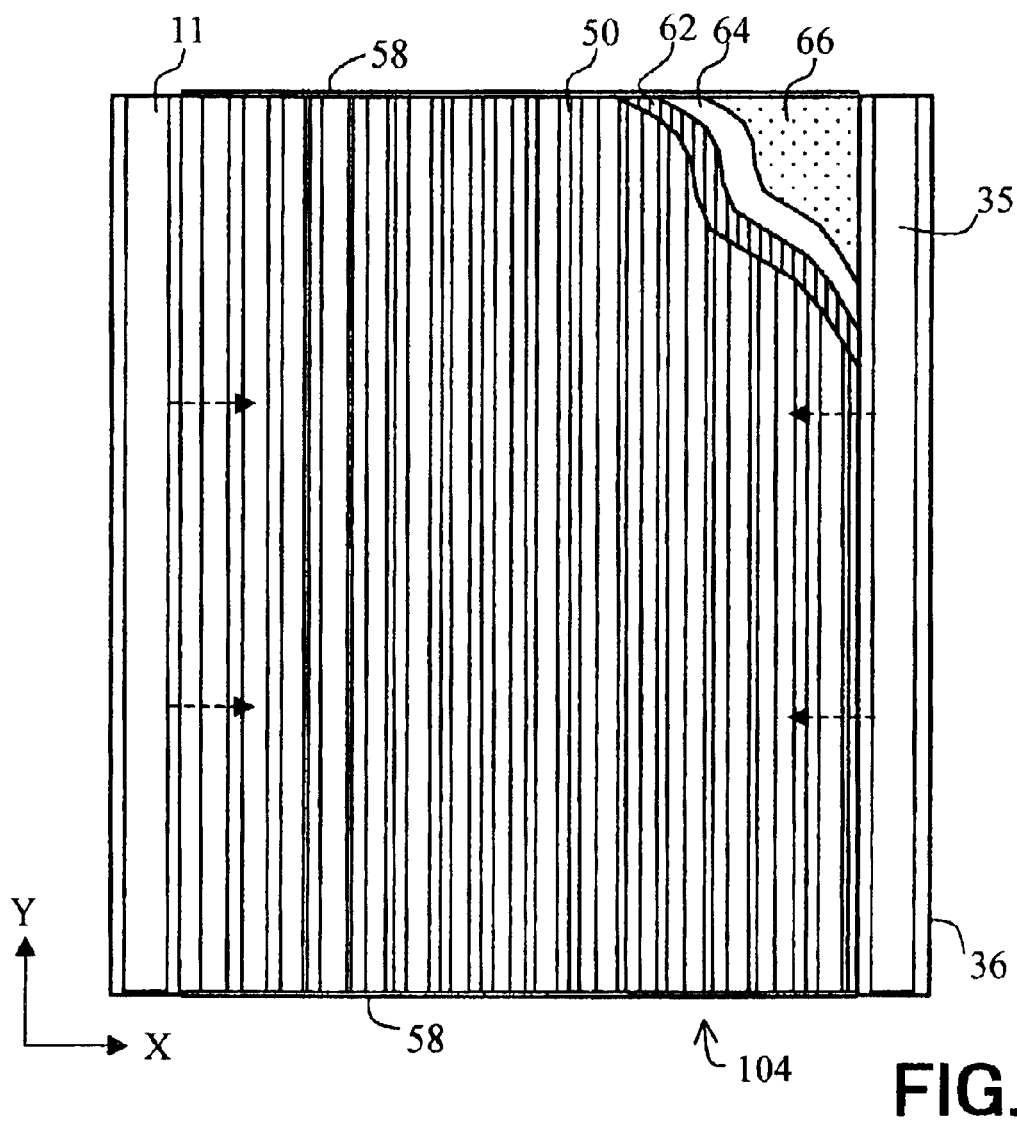
FIGS. 5A and 5B are front and bottom views of a liquid crystal display device with a backlight device, in accordance with another modification of the first embodiment of the present invention.
Figure 5B:
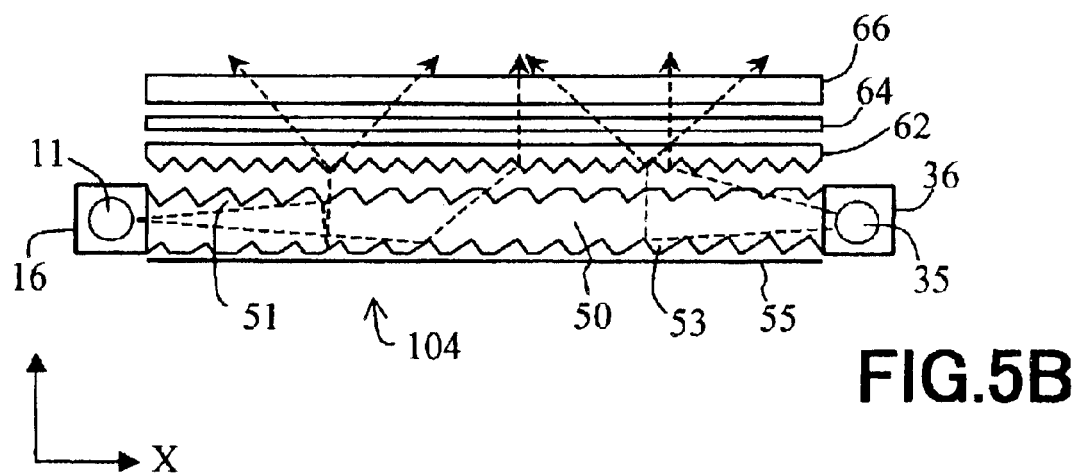

FIG. 5A is a front elevational view of a liquid crystal display device 5 including a backlight device 104, in accordance with another modification of the first embodiment, and FIG. 5B is a bottom view of the liquid crystal device 5 shown in FIG. 5A.

A low-brightness cold cathode fluorescent lamp 35 is disposed to extend along the right side of the light guide plate 50. The cold cathode fluorescent lamp 35 serves as the low-brightness light source 30, and emits light in the -X-direction toward the light guide plate 50. The structure of the remainder of the backlight device 104 is the same as the backlight device 100 shown in FIGS. 3A and 3B, and hence is not described again.

Light from the cold cathode fluorescent lamp 35 is projected in the -X direction toward the light guide plate 50 as indicated by broken-line arrows, reflected by the reflective sheets 55 and 58 disposed in the rear side and the upper and bottom sides of the light guide plate 50, respectively. The surfaces 511, 513, 515, 531, 533 and 535 of the prisms 51 and 53 cause the reflected light to be directed to the lenticular lens 62, the BEF 64 and the liquid crystal panel 66 in the manner described above with reference to FIG. 2.

The above-described embodiments are only typical examples, and those skilled in the art may readily modify the illustrated embodiments to realize the objects of the present invention based on the principle of the present invention without departing from the scope of the invention as defined by the accompanying claims, by, for example, appropriately combining the elements of the embodiments.

What is claimed is:

1. An electronic apparatus comprising a liquid crystal display device, wherein
said liquid crystal display device comprises first and second light sources, a light guide plate, and a liquid crystal unit,
said first light source is disposed on one of two opposing side surfaces of said light guide plate,
said second light source is disposed on the other of said two opposing side surfaces of said light guide plate,
a first plurality of substantially parallel grooves are formed in a first surface of said light guide plate which is substantially parallel with a display surface of said liquid crystal unit,
a second plurality of substantially parallel grooves are formed in a second surface opposing said first surface of said light guide plate,
at least one of a dimension and density of said first plurality of grooves substantially monotonically changes from one in the vicinity of one of said light sources to one in the vicinity of the other of said light sources.

2. The electronic apparatus according to claim 1 wherein said first plurality of grooves are substantially in parallel with said second plurality of grooves.

3. The electronic apparatus according to claim 1 wherein one of a depth and density of said first plurality of grooves substantially gradually decreases from one in the vicinity of the one of said light sources to one in the vicinity of the other of said light sources.

4. The electronic apparatus according to claim 1 wherein both of a depth and density of said first plurality of grooves substantially gradually decrease from a first depth and a first density in the vicinity of the one of said light sources to a second depth and a second density in the vicinity of the other of said light sources.

5. The electronic apparatus according to claim 1 wherein said first plurality of grooves are substantially all of the grooves in said first surface of said light guide plate, and at least one of a depth and a reciprocal of a pitch of said first plurality of grooves substantially gradually decreases from one in the vicinity of said one of said light sources to one in the vicinity of the other of said light sources.

6. The electronic apparatus according to claim 1 wherein said first surface of said light guide plate is a surface closer to said liquid crystal unit, said first light source is a high brightness light source, and said second light source is a low brightness light source.

7. The electronic apparatus according to claim 1 wherein at least one of a dimension and density of said second plurality of grooves substantially monotonically changes from one in the vicinity of said other of said light sources to one in the vicinity of said one of said light sources.

8. The electronic apparatus according to claim 1 wherein one of a depth and density of said second plurality of grooves substantially gradually decreases from one in the vicinity of said other of said light sources to one in the vicinity of said one of said light sources.

9. The electronic apparatus according to claim 1 wherein said second plurality of grooves are substantially all of the grooves in said second surface of said light guide plate, and at least one of a depth and a reciprocal of a pitch of said second plurality of grooves substantially gradually decreases from one in the vicinity of said other of said light sources to one in the vicinity of said one of said light sources.

10. The electronic apparatus according to claim 1 wherein said second surface of said light guide plate is a surface remote from said liquid crystal unit, said first light source is a high brightness light source, and said second light source is a low brightness light source.

11. The electronic apparatus according to claim 1 wherein each of said first plurality of grooves is formed of a first sloping surface closer to said second light source and a second sloping surface closer to said first light source, and said first sloping surface 1s gentler than said second sloping surface.

12. The electronic apparatus according to claim 1 wherein each of said second plurality of grooves is formed of a third sloping surface closer to said first light source and a fourth sloping surface closer to said second light source, and said third sloping surface is gentler than said fourth sloping surface.

13. The electronic apparatus according to claim 1 wherein each of said first plurality of grooves is formed of a first sloping surface closer to said second light source and a second sloping surface closer to said first light source, and an angle formed between said first sloping surface and a first plane in which said first surface of said light guide plate lies is smaller than an angle formed between said second sloping surface and said first plane.

14. The electronic apparatus according to claim 1 wherein each of said second plurality of grooves is formed of a third sloping surface closer to said first light source and a fourth sloping surface closer to said second light source, and an angle formed between said third sloping surface and a second plane in which said second surface of said light guide plate lies is smaller than an angle formed between said fourth sloping surface and said second plane.

15. The electronic apparatus according to claim 1 wherein said liquid crystal device further comprises a lenticular lens disposed between said light guide plate and said liquid crystal unit, and said light guide plate directs light from said first and second light sources to said lenticular lens.

16. The electronic apparatus according to claim 1 wherein said first light source is a cold cathode fluorescent lamp.

17. The electronic apparatus according to claim 1 wherein said second light source is an LED.

18. The electronic apparatus according to claim 1 wherein said first and second light sources are cold-cathode fluorescent lamps having different magnitudes of brightness.

19. The electronic apparatus according to claim 1 wherein light from said second light source enters into said light guide plate through a light guide.

20. The electronic apparatus according to claim 1, further comprising control means for selectively operating said first and second light sources in accordance with a desired brightness required for said liquid crystal display device.

21. A liquid crystal display device comprising first and second light sources, a light guide plate and a liquid crystal unit, wherein
said first light source is disposed on one of two opposing side surfaces of said light guide plate,
said second light source is disposed on the other of said two opposing side surfaces of said light guide plate,
a first plurality of substantially parallel grooves are formed in a first surface of said light guide plate which is substantially parallel with a display surface of said liquid crystal unit,
a second plurality of substantially parallel grooves are formed in a second surface opposing said first surface of said light guide plate, and
at least one of a dimension and density of said first plurality of grooves substantially monotonically changes from one in one side of said light sources to one in the vicinity of the other side of said light sources.

22. A light guide plate comprising generally rectangular first and second opposing surfaces, wherein
a first plurality of substantially parallel grooves are formed in said first surface,
a second plurality of substantially parallel grooves are formed in said second surface, and
at least one of a dimension and density of said first plurality of grooves substantially monotonically changes from one of two opposing sides of said first surface to the other of said two sides.

23. The light guide plate according to claim 22 wherein
said first plurality of grooves are substantially parallel with said second grooves,
at least one of a dimension and density of said second plurality of grooves substantially monotonically changes from one of two opposing sides of said second surface to the other of said two sides,
said one side of said second surface is located near to said one side of said first surface, and
said other side of said second surface is located near to said other side of said first surface.

24. An electronic apparatus comprising a liquid crystal display device including a light guide plate,
wherein a first plurality of substantially parallel grooves are formed in a first surface of said light guide plate, a second plurality of substantially parallel grooves are formed in a second surface of said light guide plate that is opposite to the first surface, and at least one of a dimension and density of said first plurality of grooves substantially monotonically changes from one in the vicinity of a first light source to one in the vicinity of a second light source.

25. The electronic apparatus according to claim 24, wherein said first plurality of grooves are substantially 1n parallel with said second plurality of substantially parallel grooves formed in said second surface of said light guide plate.

26. The electronic apparatus according to claim 24, wherein one of a depth and density of said first plurality of grooves substantially gradually decreases from one in the vicinity of the first light source to one in the vicinity of the second light source.

27. The electronic apparatus according to claim 24, wherein both of a depth and density of said first plurality of grooves substantially gradually decrease from a first depth and a first density in the vicinity of the first light source to a second depth and a second density in the vicinity of the second light source.

28. The electronic apparatus according to claim 24, wherein a reciprocal of a pitch of said first plurality of grooves substantially gradually decreases from one in the vicinity of the light source to one in the vicinity of the second light source.

29. The electronic apparatus according to claim 24, wherein said first light source is a high brightness light source, and said second light source is a low brightness light source.

30. The electronic apparatus according to claim 24, wherein each of said first plurality of grooves is formed of a first sloping surface closer to said second light source and a second sloping surface closer to said first light source, and said first sloping surface is gentler than said second sloping surface.

31. The electronic apparatus according to claim 24, wherein each of said first plurality of grooves is formed of a first sloping surface closer to said second light source and a second sloping surface closer to said first light source, and an angle formed between said first sloping surface and a first plane in which said first surface of said light guide plate lies is smaller than an angle formed between said second sloping surface and said first plane.

32. The electronic apparatus according to claim 24, wherein said first light source is a cold cathode fluorescent lamp or an LED.

33. The electronic apparatus according to claim 24, wherein said first light source and second light sources are cold-cathode fluorescent lamps having different magnitudes of brightness.

34. The electronic apparatus according to claim 24, further comprising a controller selectively operating said first light source and said second light source in accordance with a desired brightness.

* * * * *

UNITED STATES PATENT AND TRADEMARK OFFICE
CERTIFICATE OF CORRECTION

PATENT NO. : 6,854,857 B2  
APPLICATION NO. : 10/359719  
DATED : February 15, 2005  
INVENTOR(S) : Yasushi Hara et al.

Page 1 of 1

It is certified that error appears in the above-identified patent and that said Letters Patent is hereby corrected as shown below:

Col. 12, line 37 claim 11, change "1s" to --is--

Col. 14, line 7 claim 25, change "1s" to --is--

Signed and Sealed this

Twenty-ninth Day of January, 2008

JON W. DUDAS  
*Director of the United States Patent and Trademark Office*